No. 639,218. Patented Dec. 19, 1899.
A. R. DEMPSTER & W. D. RINEHART.
TANK VALVE.
(Application filed Dec. 15, 1898.)

(No Model.)

Attest:
W. C. Ollis
Jno Willis.

Inventor
Alexander R. Dempster
William D. Rinehart
By J. C. Sweet
Atty.

THE NORRIS PETERS CO., PHOTO-LITHO., WASHINGTON, D. C.

UNITED STATES PATENT OFFICE.

ALEXANDER R. DEMPSTER AND WILLIAM D. RINEHART, OF DES MOINES, IOWA, ASSIGNORS TO THE DEMPSTER MANUFACTURING COMPANY, OF SAME PLACE.

TANK-VALVE.

SPECIFICATION forming part of Letters Patent No. 639,218, dated December 19, 1899.

Application filed December 15, 1898. Serial No. 699,311. (No model.)

*To all whom it may concern:*

Be it known that we, ALEXANDER R. DEMPSTER and WILLIAM D. RINEHART, citizens of the United States of America, and residents of Des Moines, in the county of Polk and State of Iowa, have invented certain new and useful Improvements in Tank-Valves, of which the following is a specification.

The object of this invention primarily is to provide improved means for checking, controlling, and cutting off the flow of water from a source of supply to a tank or receptacle through the medium of a float arranged to rise and fall with the level of the water in the tank within certain predetermined limits.

A further object of this invention is to provide for utilization of the device in different positions and for different purposes—for instance, on the bottom or side of the tank—and for the purposes of controlling the flow to or from the tank according to and dependent on varying adjustments of the float-lever.

This invention consists of the construction, arrangement, and combination of elements hereinafter set forth, pointed out in the claims, and illustrated by the accompanying drawings, in which—

Figure 1:
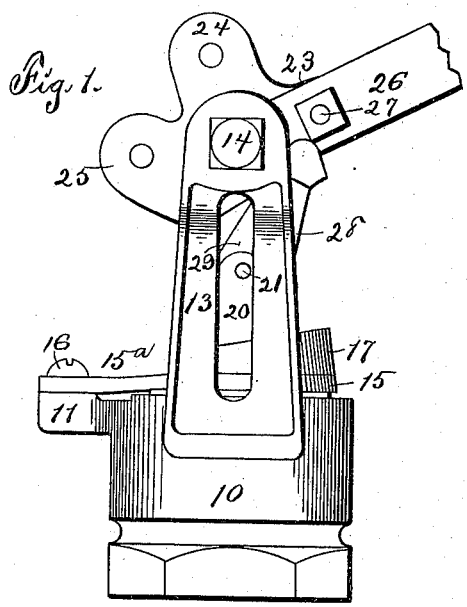
Figure 2:
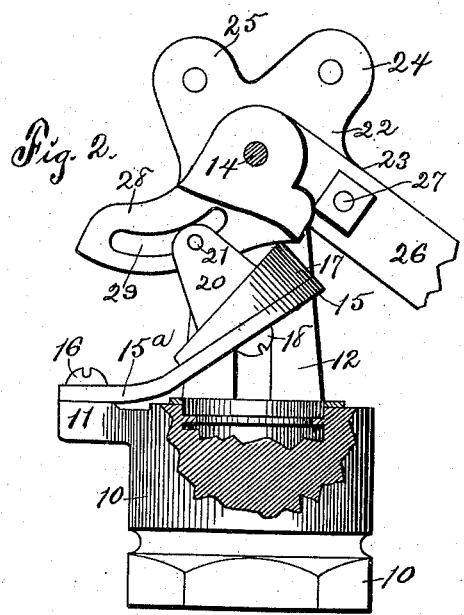
Figure 3:
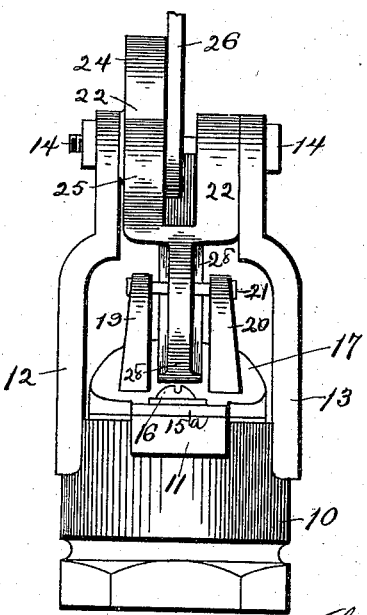

Figure 1 is a side elevation of the device detached from a tank and adjusted as to its position as a whole and the relative positions of its several movable parts as it would be when employed under float control to cut off inflowing water. Fig. 2 is an elevation, partly in section, of the device, with its movable parts adjusted relative to each other into such positions as would be assumed by them when the valve under float control is opened to permit the inflow of water. Fig. 3 is an elevation of the device at right angles to Fig. 1.

In the construction of the device as shown the numeral 10 designates a connection preferably made by casting and formed with an axial bore interiorly screw-threaded for screw-seating on a pipe for ingress or egress of water therethrough. The connection also is formed with a radial ear 11, which ear is provided with a screw-seat parallel with the bore of the connection. The connection also is formed with posts 12 13, alike in construction and form, joined at their lower ends to the periphery of the connection and extending upwardly therefrom diametrically opposite each other and a quarter of the circumference of the connection distant from the ear 11. The posts 12 13 converge abruptly above their centers, and from thence outwardly are parallel. The upper end portions of the posts 12 13 are horizontally apertured in the same plane, and a bolt 14 is mounted rigidly, yet removably, in the apertures.

A flap-valve 15 is mounted, normally, over the axial port of the connection 10 and rests on the upper end of the connection, ground to a joint, between the posts 12 13. A reduced end portion $15^a$ of the flap-valve 15 extends along the upper face of the ear 11 and is apertured to receive a screw 16, arranged and so shaped as to be mounted in the screw-seat of said ear. A valve-plug 17 of similar diameter to the bore of the connection 10 is mounted on the upper face of the flap-valve 15 and secured thereto by a screw 18, traversing an axial aperture in the valve and screw-seated in an axial seat in the plug. The flap-valve 15 is made of leather and is flexible. Posts 19 20 are formed on the valve-plug 17 and extend upwardly between the posts 12 13 a distance approximating to one-half the height of the latter said posts. The posts 19 20 are apertured horizontally in the same plane, near their upper ends, and a pin 21 is seated rigidly in the apertures. The posts 19 20 are spaced apart, and together with the pin connecting them, constitute a stem for the valve-plug.

A hub 22 is axially mounted for rotation on the bolt 14 between the posts 12 13 and is formed with three radial and integral arms 23 24 25, alike in form and construction and each apertured parallel with the axis of the hub. The hub 22 is bifurcated transversely of the bolt 14, and the arms 23 24 25 are formed on and radiate from one portion only of said hub. A float-lever 26 is apertured at one end and fulcrumed by means of the aperture on the bolt 14 within the bifurcation of the hub. A bolt 27 traverses the float-lever horizontally and is so shaped and arranged as to traverse any one or another of the apertures in the radial arms 23 24 25 of the hub, for the purpose hereinafter set forth and made clear.

A valve-actuating arm 28 is formed on and extends from the hub 22 diametrically opposite the arm 24, and the lower face of said arm 28 is curved or convexed. A slot 29 is formed in and longitudinally of the actuating-arm and is curved parallel with the lower convex face thereof. The central portion of the pin 21 traverses the slot 29 of the actuating-arm, and said arm is of such length and so arranged as to impinge, contact with, and depress the valve-plug when desired so to do and operated in the manner about to be described.

When employed as illustrated, the connection is mounted on a supply-pipe traversing the bottom of a tank and the float-lever is adjusted as shown, with a float on the outer end thereof. Water enters the tank through the connection, and as the level of the water rises in said tank the float is elevated and lifts the outer end of the lever 26. In the upward movement of the outer end of the lever 26 the hub 22 is rotated on the bolt 14 and the arm 28 depresses the valve-plug until, at the time the lever has reached its uppermost limit of movement, the arm 28 presses against the central portion of the valve-plug between the posts 19 20 thereon and holds the valve 15 in water-tight engagement with the upper face of the connection and fully and entirely cuts off the ingress of water to the tank. As the water in the tank is exhausted through evaporation or drinking by animals or any other cause the level of water falls and with it the float descends. In the descent of the float the outer end of the lever 26 descends, and in so doing the hub 22 is rotated to lift the actuating-arm 28 away from the valve-plug. In the ascent of the actuating-arm the pin 21 is engaged in the slot 29 and lifted, thereby elevating the valve-plug and oscillating the valve away from the port of the connection and permitting free ingress of water therethrough. The alternate closing and opening of the valve under the influence of the float insures a constant and only slightly-varying supply of water in the tank.

The device may be employed as an outlet-valve by adjusting the lever 26 with the bolt 27 in the aperture of the arm 25, detaching the float and attaching a wire in place of the float to the extremity of the lever, which wire would be run over a sheave on the top of the tank and allowed to depend within manual reach outside of the tank. Employed in this position with a float the device would provide an automatically-operating overflow-valve.

The device may be employed with the axis of the bore of the connection in a horizontal plane on a supply or discharge pipe traversing the side of the tank by adjusting the lever 26 with the bolt 27 in the aperture of the arm 24 of the hub, the ear 11 of the connection pointing directly upwardly. In this position the device is float-controlled to control the ingress of water to the tank, and by inverting the device it may be used under float control or with a draw-wire to govern the discharge of water from the tank.

We claim as our invention—

1. The valve device, comprising the connection, the posts thereon, the bolt connecting said posts, the hub mounted for rotation on said bolt, the apertured arms radiating from the hub, the lever pivoted on the bolt at one side of the hub and connected with one or another of the radial arms of the hub, the valve-operating arm on the hub, the ear on the connection, the flap-valve mounted on the ear, the valve-plug on the flap-valve, the stem-posts on the plug and the pin on the stem-posts engaging in the slot of the valve-operating arm of the hub.

2. In a device of the class described, the valve-operating hub, the bolt on which said hub is mounted for revolution, the float-operated arm loosely mounted on the bolt at one side of the hub, the integral radial arms on the hub, which arms are apertured in their extremities, the float-operated arm being provided with an aperture arranged to register with either of the apertures in the arms of the hub, and the pin connecting the float-operated arm and one or the other of the arms of the hub, in combination with a flap-valve, posts on said valve, a pin in said posts and a slotted arm on the hub engaging said pin on the valve-posts.

ALEXANDER R. DEMPSTER.
WILLIAM D. RINEHART.

Witnesses:
J. H. COCHRANE,
N. L. SCHAFER.